United States Patent
Morganstern et al.

(10) Patent No.: US 12,436,948 B2
(45) Date of Patent: *Oct. 7, 2025

(54) SYSTEMS AND METHODS FOR EXTRACTING DATA VIEWS FROM HETEROGENEOUS SOURCES

(71) Applicant: Sonos, Inc., Santa Barbara, CA (US)

(72) Inventors: Mark Morganstern, Santa Barbara, CA (US); Bradford Littooy, Santa Barbara, CA (US); Julia Wilkins, Seattle, WA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,213

(22) Filed: Mar. 29, 2024

(65) Prior Publication Data

US 2024/0241882 A1 Jul. 18, 2024

Related U.S. Application Data

(63) Continuation of application No. 18/316,100, filed on May 11, 2023, now Pat. No. 11,960,482, which is a continuation of application No. 16/836,652, filed on Mar. 31, 2020, now Pat. No. 11,675,786.

(51) Int. Cl.
*G06F 16/24* (2019.01)
*G06F 16/242* (2019.01)
*G06F 16/2453* (2019.01)
*G06F 40/154* (2020.01)

(52) U.S. Cl.
CPC .... *G06F 16/24535* (2019.01); *G06F 16/2445* (2019.01); *G06F 40/154* (2020.01)

(58) Field of Classification Search
None
See application file for complete search history.

(56) References Cited

U.S. PATENT DOCUMENTS

| | | | |
|---|---|---|---|
| 7,392,255 B1 | 6/2008 | Sholtis et al. | |
| 7,788,722 B1* | 8/2010 | Njemanze | G06F 16/245 726/22 |
| 8,234,256 B2* | 7/2012 | DeStefano | G06F 16/90 707/672 |
| 8,966,042 B2 | 2/2015 | Langer et al. | |
| 2007/0005596 A1 | 1/2007 | Brown et al. | |
| 2014/0229482 A1 | 8/2014 | Milenova et al. | |

(Continued)

OTHER PUBLICATIONS

Notice of Allowance mailed on Dec. 11, 2023, issued in connection with U.S. Appl. No. 18/316,100, filed May 11, 2023, 14 pages.

*Primary Examiner* — Son T Hoang

(57) ABSTRACT

One embodiment includes a method to be performed by a computing system. The method includes receiving first data comprising one or more first data fields associated with corresponding first values, receiving second data comprising one or more second data fields associated with corresponding second values, wherein at least one of the one or more second data fields corresponds to at least one of the one or more first data fields. The method further includes associating one or more of the one or more first data fields and one or more of the one or more second data fields to one or more standard data fields and generating a data view based on the one or more standard data fields.

20 Claims, 11 Drawing Sheets

(56) References Cited

U.S. PATENT DOCUMENTS

| | | |
|---|---|---|
| 2014/0244692 A1 | 8/2014 | Williamson |
| 2015/0363498 A1* | 12/2015 | Brown ................ G06F 16/2457 707/722 |
| 2016/0188685 A1* | 6/2016 | Janarthanam ....... G06F 16/9535 707/602 |
| 2016/0353156 A1 | 12/2016 | Ganesan et al. |
| 2017/0255549 A1* | 9/2017 | Zhou ....................... G06F 16/24 |
| 2018/0218019 A1 | 8/2018 | Libow et al. |
| 2019/0018844 A1* | 1/2019 | Bhagwat ................. G06F 16/14 |
| 2019/0286978 A1 | 9/2019 | Aggarwal et al. |
| 2020/0042651 A1 | 2/2020 | Curtis et al. |
| 2020/0233877 A1 | 7/2020 | Patel et al. |

* cited by examiner

| HH | EVENT_TIME | GEOID | ... | EVENT_NAME | RAW_JSON |
|---|---|---|---|---|---|
| Sonos_xh10ev3... | 2019-07-03 00:22... | 36759 | | dropout_event_logging | {"UsageMetrics": {"bldt": ... |
| Sonos_fNpWdm... | 2019-07-03 00:24... | 24784 | | playmodelEvent | {"UsageMetrics": {"bldt": ... |
| Sonos_lwhx4uT... | 2019-07-03 00:22... | 97436 | | discovery | {"UsageMetrics": {"bldt": ... |
| Sonos_xh10ev3x... | 2019-07-03 00:25... | 24856 | | hdmi | {"UsageMetrics": {"bldt": ... |
| Sonos_lwhx4uTK... | 2019-07-03 00:22... | 49634 | | chsnk_framed | {"UsageMetrics": {"bldt": ... |

FIG. 2

```
{ event_name: "volumeChange"
  hh: "Sonos123",
  model: "SonosOne",
  event_fields: { previousVolume: 3,
                  newVolume: 10 },
  room_name: "John's Bedroom",
  Time: "2020-01-02 09:12:355" }
```

305

| HOUSEHOLD_ID | MODEL_TYPE | TIMESTAMP_UTC | PREVIOUS_VOLUME | NEW_VOLUME | ROOM_NAME |
|---|---|---|---|---|---|
| Sonos123 | SonosOne | 2020-01-02 09:12:355 | 3 | 10 | John's Bedroom |

| HH | EVENT_NAME | EVENT_TYPE | ... | UPNP_CLASS | CONTROLLER_SOURCE |
|---|---|---|---|---|---|
| Sonos_xh10ev3... | playmodelEvent | instant play | | object.container.playlis... | SearchTab |
| Sonos_fNpWdm... | playmodelEvent | play from here | | object.item.audioItem.au... | BrowseTab |
| Sonos_lwhx4uT... | playmodelEvent | container play | | object.container.album.m... | HomeTab |
| Sonos_xh10ev3x... | playmodelEvent | instant play | | object.item.audioItem.mu... | RecentlyPlayed |
| Sonos_lwhx4uTK... | playmodelEvent | instant play | | object.item.audioItem.aud... | SearchTab |

```
{
  "event_name": "button_press",
  "model": "Sonos_Move",
  "Time": "2019-12-20 00:00",
  "build_version": 1,
  "event_attributes": {
    "hh": "Sonos_uMjn0vb1k8wanyL7",
    "old_volume": 7,
    "new_volume": 22,
    "event_type": "volume_change"
  }
}
```

1105

```
{
  "household_id": "Sonos_uMjn0vb1k8wanyL7",
  "event_name": "button_press",
  "model": "Sonos_Move",
  "Time": "2019-12-21 00:00",
  "build_version": 2,
  "event_attributes": {
    "past_volume": 94,
    "new_volume": 22,
    "event_type": "volume_change"
  }
}
```

1110

```
SELECT
    CASE WHEN RAW_JSON['build_version'] = 1 THEN
RAW_JSON['event_attributes']['hh']
        WHEN RAW_JSON['build_version'] = 2 THEN
RAW_JSON['household_id']
        ELSE NULL
    END as HOUSEHOLD_ID
    ,RAW_JSON['event_name'] as EVENT_NAME
    ,RAW_JSON['model'] as MODEL_NAME
    ,RAW_JSON['time'] as TIME
    ,RAW_JSON['build_version'] as BUILD_VERSION
    ,CASE WHEN RAW_JSON['build_version'] = 1 THEN
RAW_JSON['event_attributes']['old_volume']
        WHEN RAW_JSON['build_version'] = 2 THEN
RAW_JSON['event_attributes']['past_volume']
        ELSE NULL
    END as PAST_VOLUME
    ,RAW_JSON['event_attributes']['new_volume'] as NEW_VOLUME
    ,RAW_JSON['event_attributes']['event_type'] as EVENT_TYPE
FROM MY_RAW_DATA;
```

1115

| HOUSEHOLD_ID | EVENT_NAME | MODEL_NAME | TIME | BUILD_ VERSION | PAST_ VOLUME | NEW_ VOLUME | EVENT_TYPE |
|---|---|---|---|---|---|---|---|
| Sonos_uMjnyL7 | button_press | Sonos_Move | 2019-12-20 00:00 | 1 | 7 | 22 | volume_change |
| Sonos_uMjnyL7 | button_press | Sonos_Move | 2019-12-21 00:00 | 2 | 94 | 22 | volume_change |

SYSTEMS AND METHODS FOR EXTRACTING DATA VIEWS FROM HETEROGENEOUS SOURCES

CROSS-REFERENCE TO RELATED APPLICATIONS

The current application is a continuation of U.S. patent application Ser. No. 18/316,100, filed May 11, 2023, which is a continuation of U.S. patent application Ser. No. 16/836,652, filed Mar. 31, 2020. Both of these applications are incorporated by reference in their entirety for all purposes.

FIELD OF THE INVENTION

The present invention generally relates to data ingestion and, more specifically, extracting data views from heterogeneous sources.

BACKGROUND

Data in its many forms can be used to drive various business and design decisions throughout an organization. New sources can be brought into existing data warehouses and new tools can be implemented to use the new data. However, as the sources of data grow, the incoming formats for the data can grow as well, making it increasingly difficult to manage. In some cases, the structure of incoming data can change as software versions change or may not have a fixed structure at all. It can often be difficult to maintain a consistent and singular view of the data.

SUMMARY OF THE INVENTION

Systems and methods for extracting data views from heterogeneous data sources in accordance with embodiments of the invention are illustrated. One embodiment includes a method for extracting data views. The method includes steps for receiving data from several data sources and identifying raw fields from the received data. The process further includes steps for mapping the identified raw fields to common fields by determining similarities between a raw field and each of the common fields, identifying a target common field based on the determined similarities, and mapping the raw field to the target common field. The process further includes steps for extracting views of the received data based on the mapping of the identified raw fields to common fields.

In a further embodiment, the received data is in an extensible markup language (XML) format, wherein the method further includes processing the received data to convert the XML format to a JavaScript Object Notation (JSON) format.

In still another embodiment, determining similarities between a raw field and each of the common fields includes determining a similarity in a set of one or more characteristics of the raw field and the common field. The set of characteristics includes at least one of the field name, the field data type, associated fields, or a data distribution of values for the field. The target common field is the common field with a highest similarity to the target common field.

In a still further embodiment, mapping the identified raw fields to common fields comprises obtaining metadata for each of the common fields. The metadata includes aggregation data that describes how a field can be aggregated. Extracting views includes generating a query to view the received data based on the mapping of the identified raw fields to the common fields, where the query aggregates the data based on the metadata for each raw field.

In yet another embodiment, extracting views includes generating a query to view the received data based on the mapping of the identified raw fields to the common fields, where each field of the received data is represented in the generated query.

In a yet further embodiment, the received data includes several records, where a first record includes a particular number of fields and a second record includes a different number of fields.

In another additional embodiment, the received data from the several data sources includes event logs from playback devices and controllers.

One embodiment includes a non-transitory machine readable medium containing program instructions for extracting data views, wherein the program instructions are executable by one or more processors to perform a process that comprises receiving data from several data sources, identifying raw fields from the received data, mapping the identified raw fields to common fields by determining similarities between a raw field and each of the common fields, identifying a target common field based on the determined similarities, and mapping the raw field to the target common field, and extracting views of the received data based on the mapping of the identified raw fields to common fields.

One embodiment includes an apparatus with one or more processors, one or more non-transitory computer-readable media, and program instructions stored on the one or more non-transitory computer-readable media. The program instructions are executable by the one or more processors such that the apparatus is configured to receive data from several data sources and identify raw fields from the received data. The apparatus is further configured to map the identified raw fields to common fields by determining similarities between a raw field and each of the common fields, identifying a target common field based on the determined similarities, and mapping the raw field to the target common field. The apparatus is further configured to extract views of the received data based on the mapping of the identified raw fields to common fields.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments and should not be construed as a complete recitation of the scope of the invention.

FIG. 2 illustrates an example of records of a processed data storage in accordance with an embodiment of the invention.

FIG. 3 illustrates an example of extracting JSON to an individual record in accordance with an embodiment of the invention.

FIG. 4 illustrates an example of a raw metadata table in accordance with an embodiment of the invention.

FIG. 5 illustrates an example of an extract view in accordance with an embodiment.

FIG. 11 illustrates an example of a generated query in accordance with an embodiment of the invention.

DETAILED DESCRIPTION

Figure 1:
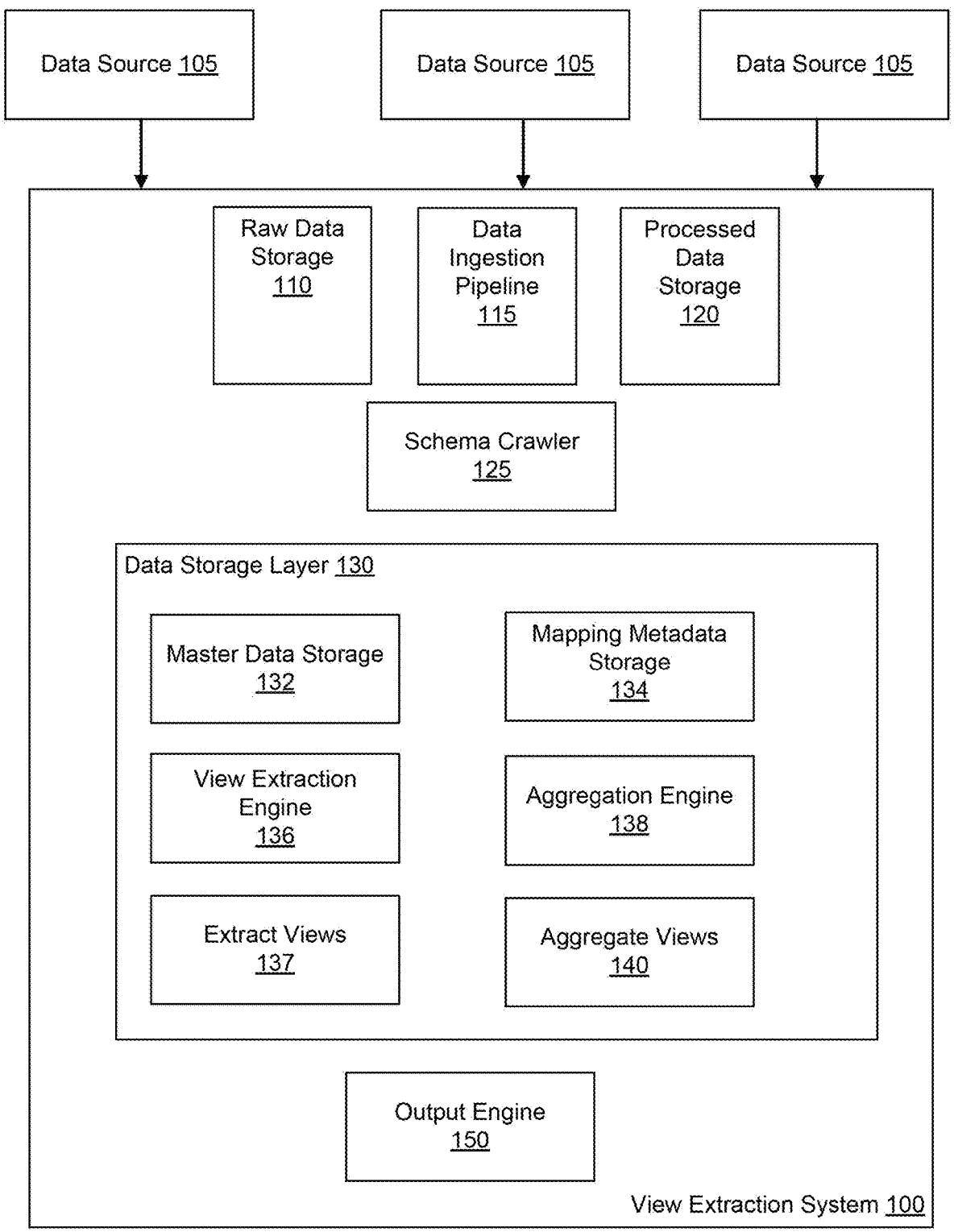
FIG. 1 illustrates an example of a view extraction system in accordance with an embodiment of the invention.

Turning now to the drawings, systems and methods for extracting data views from various heterogeneous data sources are described herein. It can often be difficult to work with data from heterogeneous data sources. Data can vary in the number of fields, field names, field data types, data formats, schemas, etc. Even from the same data source, data can vary between different versions, log groups, time frames, events, etc. For example, event logs from a playback device may include records for playback events (e.g., with song_name, music_service, play_duration, etc.) and network events (e.g., with disconnect_count, network_name, ip_address, etc.) which may require very different fields. It would not make sense to have a universal schema for such a system. Consuming and analyzing data with such various and flexible data structures can be complex and time-consuming.

In some cases, a single field may have multiple different names, depending on various factors, such as (but not limited to) software version, vendor, region, data source, etc. For example, in some cases different development teams can reference a single field (e.g., a name for a household) by various different field names (e.g., hh_name, household_name, Household_Name, HH_Name, etc.). The same field may have different names across events, data sources, software versions, timeframes, etc., which can lead to confusion about whether two fields are actually referencing the same thing.

View extraction systems in accordance with various embodiments can analyze schema from heterogeneous data sources to automatically extract consistent views of the data. Extracting views of the data in accordance with numerous embodiments of the invention can include (but is not limited to) automatically generating tables (e.g., intermediate tables, aggregation tables, etc.) and/or views (e.g., SQL queries). Intermediate tables in accordance with certain embodiments of the invention can be separated for different types of data and/or timeframes. For example, in certain embodiments, intermediate tables can be generated for different event types across multiple timeframes (e.g., hourly, weekly, etc.).

In several embodiments, view extraction systems can map one or more raw fields (e.g., fields found in the data as it is received) to a corresponding common, or standardized, field that can be used consistently in different views (e.g., query views, hardened tables, etc.) of the data. In a number of embodiments, corresponding raw and common fields can be identified based on various characteristics, such as (but not limited to) field name similarity and/or data type.

Raw fields in accordance with several embodiments can be identified from data stored in a semi-structured, non-tabular data structure (e.g., JavaScript Object Notation (JSON), Extensible Markup Language (XML), HyperText Markup Language (HTML), comma-separated values (CSV), etc.). In a variety of embodiments, by monitoring and maintaining mappings of raw fields to common fields, processes can provide consistent views of the data, even if the underlying data structure changes.

In some embodiments, metadata for mappings from raw fields to common fields can be used to map new raw fields and/or extract views of the data. Mapping metadata in accordance with numerous embodiments can include aggregation data that describes how various fields are to be aggregated (e.g., group by, sum, average, distinct count, percentiles, etc.). Aggregation data for a new field in accordance with some embodiments can be programmatically determined based on a similarity of data in the new field to other common fields. In a number of embodiments, aggregation data for a new common field can be determined based on user input (e.g., when the field is created). Aggregation data in accordance with several embodiments can be used to provide queries (e.g., structured query language (SQL)) for aggregate views of the data and/or to aggregate the data into aggregate tables that can be queried efficiently (e.g., for reporting and/or analyses). In some embodiments, common fields and/or aggregates can be used to provide data that can be dynamically viewed through data visualization tools (e.g., TABLEAU).

In various embodiments, mappings and the associated metadata can be used to automatically extract different views of the data. Extracting views, as referred to in this description, can include (but is not limited) generating queries for viewing data, storing data in new tables of a database, modifying data in existing tables of a database, and/or generating schemas for viewing data in a database.

Although many of the examples described herein examples in the context of event logs for consumer electronics devices, one skilled in the art will recognize that similar systems and methods can be used in a variety of applications with various different kinds of data, including (but not limited to) sales data, medical data, financial data, etc., without departing from this invention.

Systems and methods in accordance with several embodiments provide a novel and inventive solution to the technical problem of extracting data views of heterogeneous data from various sources, where the extracted views provide consistent data views that can be queried against without access to or specific knowledge of the heterogeneous data. By monitoring and maintaining the mappings with an automated schema crawler, downstream views of the data can remain consistent, even when the underlying data structures change. Generation of metadata mapping tables in accordance with numerous embodiments can provide a technical solution that allows a data provider to automatically maintain and aggregate streams of incoming data in a manner that allows for efficient querying and/or retrieval of the data with reduced memory and processing requirements.

Systems for Extracting Views
View Extraction System

An example of a view extraction system in accordance with an embodiment of the invention is illustrated in FIG. 1. View extraction systems in accordance with some embodiments can be used to intake heterogeneous data, maintain mappings, update schemas, aggregate data and/or visualize data. In this example, view extraction system 100 takes in data from data sources 105 and extracts views of the data that can be presented through output engine 150.

Data sources can include (but are not limited to) consumer devices, controllers, server systems, cloud services, backend services, third-party providers, etc. In some embodiments, data sources can provide any of a variety of different types of data, including (but not limited to) log data, sales data, software application data, and/or medical data. Log data in accordance with various embodiments can include data from various different logs, including (but not limited to) event logs from cloud services, access logs, consumer device logs, error logs, event logs, customer care data, and/or battery telemetry. Consumer device logs in accordance with numerous embodiments can include, but are not limited to, event data (e.g., playback events, volume changes, changes to input sources, connection errors, streaming service events, playback time, user input events, etc.) for playback devices (e.g., speakers) and controllers in a media playback system. In several embodiments, consumer device logs can include other status data, such as (but not limited to) streaming service used, room name, device status, volume level, etc. Data from the different data sources can vary in the number of fields, field names, field data types, data formats, schemas, etc. Even from the same data source, data can vary between different versions, log groups, time frames, events, etc. In a variety of embodiments, different records from the same source can have different schema.

View extraction system 100 includes raw data storage 110, data ingestion pipeline 115, processed data storage 120, schema crawler 125, data storage layer 130, and output engine 150. Data ingestion pipeline 115 processes data from raw data storage 110 to process the data for processed data storage 120. Raw data storages in accordance with numerous embodiments can include relational databases that store raw data as it is received from the data sources. Raw data storages in accordance with several embodiments of the invention can include structured data, semi-structured data, and/or unstructured data. In a variety of embodiments, raw data that is received from data sources can be processed by the data source prior to being stored in raw data storage.

Data ingestion pipelines in accordance with a variety of embodiments can perform a number of different processing tasks on data of the raw data storage, such as (but not limited to) data conversions (e.g., XML to JSON, etc.), data normalization, and/or adding new fields (e.g., enriched time stamps, other metadata, etc.). In certain embodiments, data ingestion pipelines can separate composite data from the raw data into individual components.

Processed data storages in accordance with several embodiments can store the processed data from a data ingestion pipeline. In many embodiments, processed data storages can store at least a portion of the data in a non-columnar semi-structured format (e.g., JSON, XML, CSV, etc.), which can allow for the storage of incoming data that may not have a fixed or predictable format (e.g., number/order of fields per record). An example of records of a processed data storage in accordance with an embodiment of the invention is illustrated in FIG. 2. In this example, the processed data provides various data fields (e.g., household ID (HH), event time (EVENT_TIME), geo ID (GEOID), and event name (EVENT_NAME)) for various events. The processed data also includes a field with raw JSON, which contains fields from the logged event. The JSON for each record may include different numbers of fields with different names, which can make it difficult to get a good sense of what data is available within the data.

Although many of the examples described herein describe data ingestion pipelines and performing processes on processed data, one skilled in the art will recognize that similar systems and methods can receive raw semi-structured data (e.g., JSON, XML, HTML, etc.) that can be directly crawled in their raw formats, without departing from this invention.

Schema crawler 125 analyzes data in processed data storage 120 to identify raw fields from the processed data and map them to common fields used in the data storage layer 130. Schema crawlers in accordance with several embodiments can crawl data to determine schemas and/or raw data fields for different data sets. In numerous embodiments, schema crawlers can take non-tabular data (e.g., JSON) and extract out all the fields into individual columns. Schema crawlers in accordance with a variety of embodiments can crawl the data to identify raw fields and map the raw fields to common fields in the view extraction system.

An example of extracting JSON to an individual record in accordance with an embodiment of the invention is illustrated in FIG. 3. In this example, JSON record 305 includes various fields "event_name", "hh", "model", etc. The field "event_fields" includes nested fields "previousVolume" and "newVolume". Each of the fields has a value (e.g., the value of event_name is "volumeChange"). In various embodiments, nested fields are stored as raw fields that indicate the nesting (e.g., "previousVolume" nested under "event_fields" may be stored as "[event_fields][previousVolume]"). In this example, JSON record 305 has been mapped to tabular record 310 in an extracted view (or intermediate table) of "volumeChange" events). Although in this example JSON record 305 is displayed across multiple lines with indentation to denote nesting, data records in accordance with a number of embodiments of the invention can be stored as single lines (e.g., in a text file, in a data field, etc.). Tabular record 310 shows a row with corresponding field names and values, where each field (including the nested fields) is represented as a separate column in the record. As can be seen in this example, the raw field names from JSON record 305 are mapped to common field names in the tabular record 310 (e.g., "hh"→"HOUSEHOLD_ID").

In many cases, large volumes of new data are received and stored in the raw data storages of a view extraction system. In various embodiments, schema crawlers may evaluate only a portion of the new data to identify the raw fields of the incoming data and/or to map the incoming raw fields to common fields. In some embodiments, the evaluated portion is selected by randomly sampling from the available data in the raw data storage. By evaluating only a portion of the new data, schema crawlers in accordance with a number of embodiments can reduce the memory and processor usage required for extracting data views. Schema crawlers in accordance with numerous embodiments can operate according to a set of parameters that dictate various criteria for sampling from the raw data, such as (but not limited to) which datasets are to be monitored or analyzed, which raw fields should be included in the crawl, how much of the data is to be crawled, and/or how often the data sources should be crawled. Parameters in accordance with a variety of embodiments can provide filters for certain elements (e.g., fields, data sources, events, etc.) to be excluded.

In a number of embodiments, parameters can determine a percentage of the data to be sampled and analyzed. The percentage to be sampled can be separately determined based on various criteria (e.g., data source, events, update frequency, etc.) in accordance with many embodiments. In numerous embodiments, the percentage to be scanned can depend on a heterogeneity in formats from a given data source. For example, when data from a particular data source is highly variable (e.g., in the number of fields and/or field names), a larger percentage of the data may be scanned in a given crawl. Similarly, the frequency for which different data sources are crawled can differ based on factors such as (but not limited to) the heterogeneity of the data, the frequency with which the data source is updated, etc. The percentage of data scanned may be in the range of 50-100%.

In various embodiments, schema crawlers can separate the data to be analyzed into bins (or batches), which can be divided among multiple processors to parallelize the schema crawl across different batch jobs. Schema crawlers in accordance with many embodiments can sample data from different data sources, records, and/or events for the different bins. In various embodiments, schema crawlers in accordance with some embodiments can operate continuously (or periodically) to monitor and maintain the mappings of raw fields to common fields to allow queries and/or reports created against the common fields to remain consistent even when the underlying raw data fields change.

Upon evaluating the incoming data and identifying the raw fields, schema crawlers in accordance with certain embodiments can map the identified raw fields to common fields. Mapping raw fields in accordance with many embodiments can be performed manually and/or automatically. In certain embodiments, mappings for raw fields can be performed by crowdsourcing the mappings with experts (e.g., developers of an application associated with the data source, data warehouse engineers, analysts, etc.). In certain embodiments, processes can automatically map raw fields to common fields based on various factors, such as (but not limited to) similarities in the field names, data types of the raw and common fields, context information (e.g., other related fields for the record, data source, etc.). In certain embodiments, fields that are not mapped to a common field are deactivated and not included as part of the master data for a data storage layer.

In a variety of embodiments, the mappings of raw fields to common fields is limited to a single raw field name for a given common field for a particular characteristic range (e.g., version, region, dates, etc.). For example, while different versions of the firmware may have different raw field names mapped to a particular common field, for a given version of firmware, only one (e.g., the most common) field name can be mapped to the particular common field. Processes for mapping raw fields to common fields in accordance with certain embodiments are described in greater detail below with reference to FIG. 10.

Referring back to FIG. 1, data storage layer 130 includes master data storage 132, mapping metadata storage 134, view extraction engine 136, aggregation engine 138, and aggregate views 140. Mappings determined by schema crawler 125 can be stored in mapping metadata storage 134 of data storage layer 130. In addition to the mappings, mapping metadata storage 134 can store metadata related to the mappings, which can be used to extract views of the data stored in master data storage 132.

In numerous embodiments, data storage layers can include relational databases and/or large-scale cloud data warehouse solutions (e.g., Snowflake). Data warehouse solutions can be used to store data that can be used for reporting, modeling, and/or analyses. Data in data warehouse solutions can be arranged in different schemas and tables to organize data for faster querying on large datasets.

Master data storages in accordance with some embodiments can include data from a processed data storage that has been mapped to common fields. In some embodiments, access to master data storages is restricted from any reporting or query functionality. Master data storages in accordance with a number of embodiments can include all active raw data fields, whether they have been mapped to a common field or not. In various embodiments, tables of master data storages contain only a few columns, such as (but not limited to) high-level header fields, event names, and a column containing JSON payloads (e.g., from a data ingestion pipeline).

Mapping metadata storages in accordance with various embodiments can store mappings (e.g., from a schema crawler) and associated metadata to allow for querying and/or aggregating data from master data storages. In certain embodiments, mapping metadata can include raw metadata for the raw fields and/or common metadata for the common fields. By utilizing mapping metadata, processes in accordance with many embodiments of the invention can automatically generate schema and/or full SQL to create event-specific views and/or tables with variable JSON fields.

Figure 4:
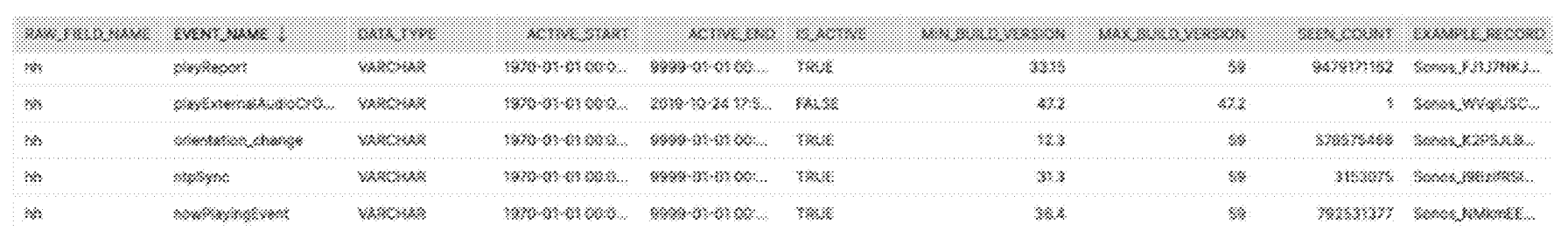

In several embodiments, mapping metadata tables can include separate tables for raw metadata and common field metadata, which can be joined to determine the mappings of the raw fields to the common fields. An example of a raw metadata table in accordance with an embodiment of the invention is illustrated in FIG. 4. In this example, raw fields (RAW_FIELD_NAME) are listed per event (EVENT_NAME). Each raw field has a data type (DATA_TYPE), a status indicator (IS_ACTIVE), an active range (ACTIVE_START and ACTIVE_END), a build range (MIN_BUILD_VERSION and MAX_BUILD_VERSION), a count of times that the raw field has been seen (SEEN_COUNT), and an example record (EXAMPLE_RECORD). In many embodiments, multiple example records may be stored (e.g., in a single field, in a separate table, etc.) for a given field. Example records in accordance with a number of embodiments of the invention can be randomly sampled from the data to provide a representative sample of field values.

Raw metadata in accordance with several embodiments can include, but is not limited to, active status, a frequency count for the number of times the raw field occurs in the crawled data, characteristic ranges (e.g., version, region, dates, etc.) for which the raw field is active, data type, and/or an example of a value for the field from the raw data. In several embodiments, data types are not evident from the raw data and can be inferred from the values for the field in the raw data. Data types for raw fields can include any of a variety of data types, such as (but not limited to) numeric, varchar, Boolean, array, and/or timestamp.

Common field metadata in accordance with several embodiments can include (but is not limited to) active status, data type, definition, description, and/or aggregation settings. Aggregation settings in accordance with a number of embodiments can include various variables determining whether the field should be used as a grouping aggregate (e.g., for GROUP BY) or for an aggregate calculation (e.g., for a sum, average, distinct count, percentile calculations, and/or timeframes.

In various embodiments, mapping metadata can be used to determine the mapping of raw fields to common fields. For example, when an unmapped raw field with a same name as an existing raw field is identified, but with a different data type, processes in accordance with a variety of embodiments can determine whether to use the new data type or the existing data type based on which data type is more common in the raw data. For example, when raw fields of a certain data type exceed a threshold (e.g., 95%) of the seen count of raw fields associated with a given common field, processes in accordance with many embodiments can change the data type for the given common field to the certain data type.

In some embodiments, mapping metadata can be used to provide a data catalog of available common fields, along with various metadata related to the common fields, such as (but not limited to) sample data values, brief descriptions, data type, aggregation settings, etc. Data catalogs in accordance with certain embodiments can provide a metadata repository that can be used to automate schema and aggregation creation. In certain embodiments, data catalogs can be presented to users (e.g., via a graphical user interface) to provide metadata about the common data fields and pre-aggregated metrics that are available.

In the example of FIG. 1, view extraction engine 136 can operate on the master data storage to generate extract views 137. Extract views (e.g., intermediate tables) in accordance with numerous embodiments can include automatically created views for different subsets of the data (e.g., by event type, time frame, etc.). The different subsets may share many of the same fields and/or properties. For example, extract views in accordance with certain embodiments of the invention can include separate views for playback events for the past week, playback events for the past month, network events for the past week, and network events for the past month.

Although views often refer to live queries that can be used to query tables of the master data storage 132, views in accordance with a variety of embodiments can also refer to hardened tables that are generated based on such queries. An example of an extract view in accordance with an embodiment is illustrated in FIG. 5. In this example, each field is a common field with a consistent naming convention. Extract view 500 includes common fields and/or raw fields (not shown) for all of the active raw fields in the ingested data. In a number of embodiments, extract views contain all of the available mapped common fields and/or active raw fields. Active raw fields in accordance with numerous embodiments can include fields from the raw data that are not mapped to any of the common fields, but have been marked for inclusion in the data storage layer.

Aggregation engine 138 can operate on the extract views and/or the master data storage 132 to generate aggregate views 140. Aggregation engines in accordance with numerous embodiments can automatically aggregate data from master data storages based on the common fields and aggregation settings from the mapping metadata. In certain embodiments, aggregation engines can aggregate data over specific fields and/or over specified timeframes (e.g., one hour, one day, seven days, six months, etc.). In many embodiments, aggregation engines can automatically generate queries (e.g., in SQL) from the mapping metadata that can be used for aggregate views and/or hardened aggregation tables. In many embodiments, aggregation engines can aggregate data from the extract views and/or the master data storage.

Output engine 150 can access data from extract views 137 and/or via aggregate views 140 to present the data to a user. In various embodiments, output engines can provide the data in response to a query against the extracted views. Output engines in accordance with many embodiments can provide visualizations (e.g., reports, charts, models, etc.) of the extracted data views. In some embodiments, output engines can provide an interface for third-party visualization tools (e.g., TABLEAU), which can provide tools for visualizing the extracted view data.

As can readily be appreciated the specific computing system used to extract views from data is largely dependent upon the requirements of a given application and should not be considered as limited to any specific computing system(s) implementation. For example, various different data storages are described reference to the example above, but one skilled in the art will recognize that such data storages can refer to various data storage schemes, such as (but not limited to) a single data storage, distributed data storages, cloud services, or a combination thereof. Data for view extraction systems in accordance with some embodiments of the invention can be stored in various different data storage formats, including (but not limited to) as records in a set of one or more databases, as multiple records in a single file, as individual files for individual records, and/or as one or more records in a single field for each record of a database.

Figure 6:
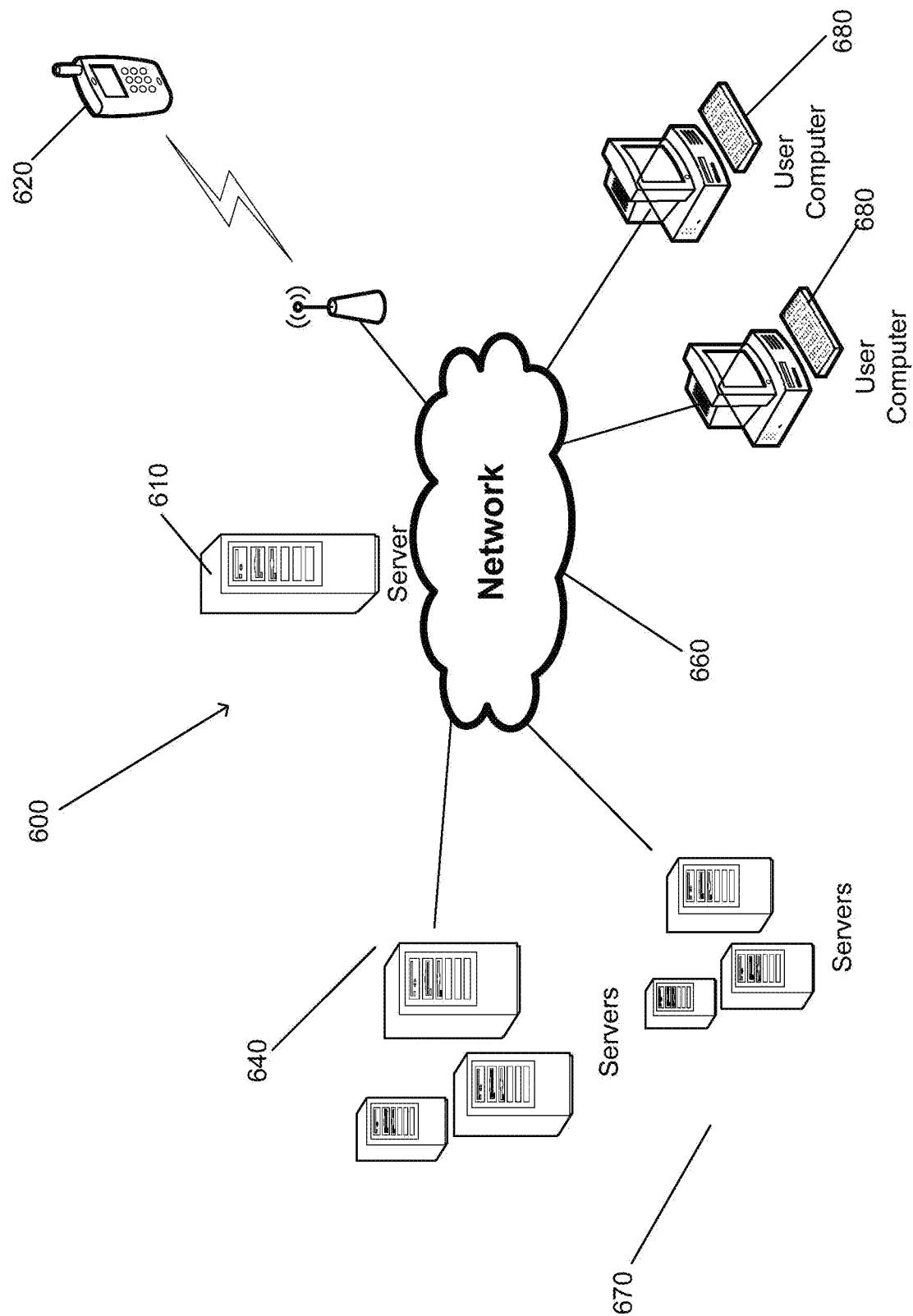
FIG. 6 illustrates another example of a view extraction system that transforms data in accordance with some embodiments.

Another example of a view extraction system that transforms data in accordance with some embodiments is shown in FIG. 6. Network 600 includes a communications network 660. The communications network 660 is a network such as the Internet that allows devices connected to the network 660 to communicate with other connected devices. Server systems 610, 640, and 670 are connected to the network 660. Each of the server systems 610, 640, and 670 is a group of one or more servers communicatively connected to one another via internal networks that execute processes that provide cloud services to users over the network 660. For purposes of this discussion, cloud services are one or more applications that are executed by one or more server systems to provide data and/or executable applications to devices over a network. The server systems 610, 640, and 670 are shown each having three servers in the internal network. However, the server systems 610, 640 and 670 may include any number of servers and any additional number of server systems may be connected to the network 660 to provide cloud services. In accordance with various embodiments of this invention, view extraction systems that use systems and methods that extract views in accordance with an embodiment of the invention may be provided by a process being executed on a single server system and/or a group of server systems communicating over network 660.

Various functions (e.g., data processing, raw field identification, mapping, view extraction, aggregation, etc.) of view extraction systems in accordance with some embodiments can be implemented on a single processor, on multiple cores of a single computer, and/or distributed across multiple processors on multiple different computers. Similarly, various storages (e.g., raw data storage, processed data storage, master data storage, mapping metadata storage, etc.) of view extraction systems in accordance with several embodiments can be stored in a single database, distributed across multiple database servers, or distributed across multiple different database platforms on multiple different servers.

Users may use personal devices 680 and 620 that connect to the network 660 to perform processes that extract and/or visualize extracted views in accordance with various embodiments. In the shown embodiment, the personal devices 680 are shown as desktop computers that are connected via a conventional "wired" connection to the network 660. However, the personal device 680 may be a desktop computer, a laptop computer, a smart television, an entertainment gaming console, or any other device that connects to the network 660 via a "wired" connection. The mobile device 620 connects to network 660 using a wireless connection. A wireless connection is a connection that uses Radio Frequency (RF) signals, Infrared signals, or any other form of wireless signaling to connect to the network 660. In FIG. 6, the mobile device 620 is a mobile telephone. However, mobile device 620 may be a mobile phone, Personal Digital Assistant (PDA), a tablet, a smartphone, or any other type of device that connects to network 660 via wireless connection without departing from this invention.

As can readily be appreciated the specific computing system used to extract views from data is largely dependent upon the requirements of a given application and should not be considered as limited to any specific computing system(s) implementation.

View Extraction Element

Figure 7:
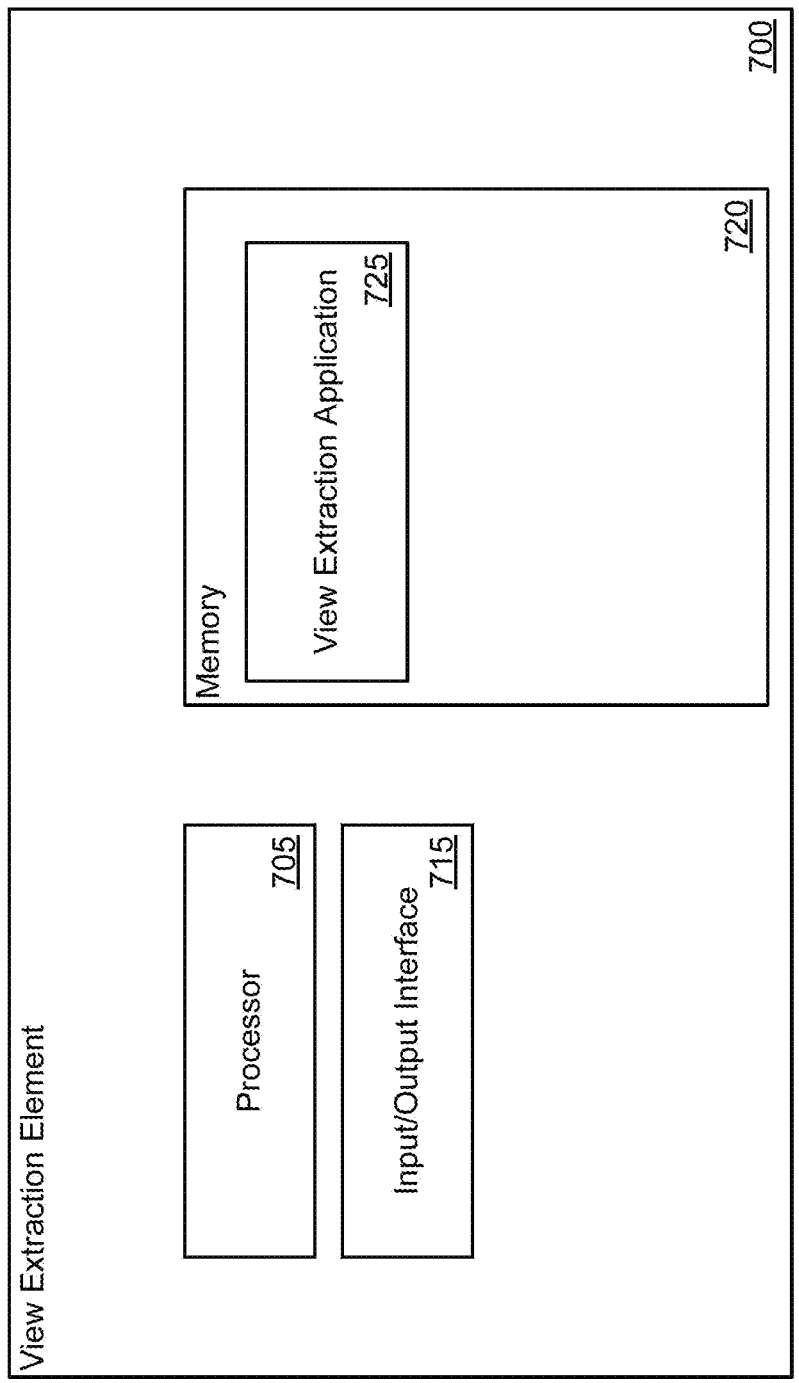
FIG. 7 illustrates an example of a view extraction element that executes instructions to perform processes that extract views from raw data in accordance with various embodiments.

An example of a view extraction element that executes instructions to perform processes that extract views from raw data in accordance with various embodiments is shown in FIG. 7. View extraction elements in accordance with many embodiments can include (but are not limited to) one or more of mobile devices, servers, cloud services, and/or other computers. View extraction element 700 includes processor 705, input/output interface 715, and memory 720. One skilled in the art will recognize that a view extraction element may exclude certain components and/or include other components that are omitted for brevity without departing from this invention.

The processor 705 can include (but is not limited to) a processor, microprocessor, controller, or a combination of processors, microprocessor, and/or controllers that performs instructions stored in the memory 720 to manipulate data stored in the memory. Processor instructions can configure the processor 705 to perform processes in accordance with certain embodiments.

Input/output interfaces in accordance with a variety of embodiments can be used for various functions, such as (but not limited to) interacting with databases, communicating across a network, receiving user inputs, and/or providing notifications and user prompts based upon the instructions performed by processor 705.

Memory 720 includes view extraction application 725. View extraction applications in accordance with several embodiments can be used to extract views from raw data. In some embodiments, view extraction applications can include one or more of a schema crawler, a view extraction engine, and/or an aggregation engine, such as those described throughout this description. One skilled in the art will recognize that a view extraction application may exclude certain components and/or include other components that are omitted for brevity without departing from this invention.

Although a specific example of a view extraction element 700 is illustrated in FIG. 7, any of a variety of view extraction elements can be utilized to perform processes for extracting views from data similar to those described herein as appropriate to the requirements of specific applications in accordance with embodiments.

View Extraction Process

Figure 8:
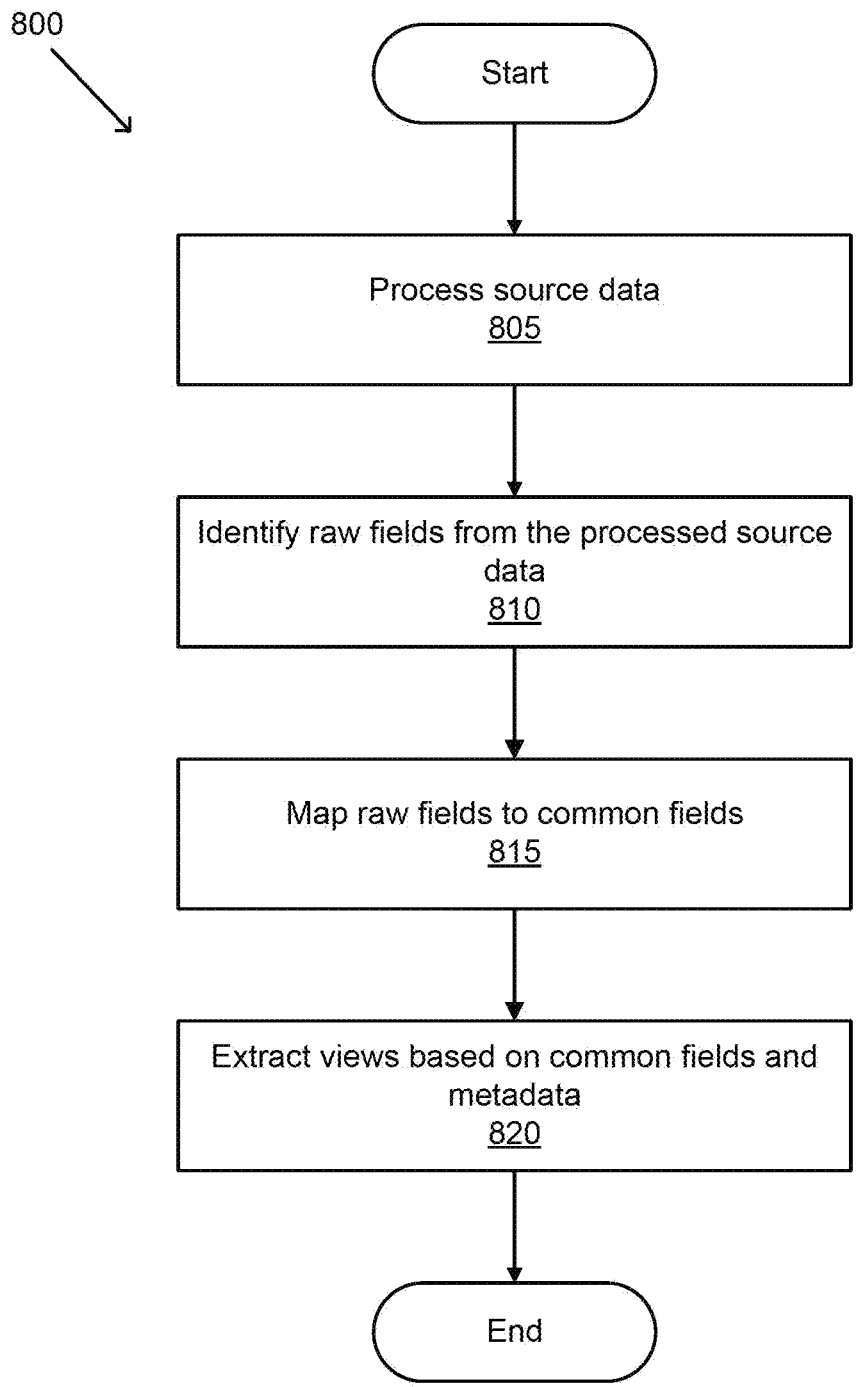
FIG. 8 conceptually illustrates an example of a process for extracting data views in accordance with an embodiment of the invention.

An example of a process for extracting data views in accordance with an embodiment of the invention is conceptually illustrated in FIG. 8. Process 800 processes (805) source data. Source data in accordance with certain embodiments of the invention can include structured data, semi-structured data, unstructured data, raw data, and/or processed data. Processing source data in accordance with many embodiments can include (but is not limited to) data conversions (e.g., XML to JSON, etc.), data normalization, and/or adding new fields (e.g., enriched time stamps, other metadata, etc.). In some embodiments, processing source data can include breaking out a single composite record into multiple component records.

Process 800 identifies (810) raw fields from the processed source data. In numerous embodiments, processes can identify raw fields from a subset of the processed source data. The subset of the processed source data in accordance with certain embodiments can be randomly sampled from the processed source data. In several embodiments, processes can sample the data based on various factors, such as (but not limited to) system settings, data source settings, data source activity, raw field settings, etc. In a variety of embodiments, a percentage of the processed source data is to be sampled. The percentage to be sampled can be separately determined based on various criteria (e.g., data source, events, update frequency, etc.) in accordance with many embodiments. In numerous embodiments, the percentage to be scanned can depend on a heterogeneity in formats from a given data source. For example, when data from a particular data source is highly variable (e.g., in the number of fields and/or field names), a larger percentage of the data may be scanned in a given crawl. In various embodiments, processes can divide the data to be analyzed into bins (or batches), which can be distributed among multiple processors to parallelize the schema crawl across different batch jobs.

Process 800 maps (815) the identified raw fields to common fields. Mapping raw fields in accordance with many embodiments can be performed manually and/or automatically. In certain embodiments, processes can automatically map raw fields to common fields based on various factors, such as (but not limited to) similarities in the field names, data types of the raw and common fields, context information (e.g., other related fields for the record, data source, etc.). In numerous embodiments, mappings of raw fields to common fields can be stored in a mapping table. Mapping tables in accordance with many embodiments can also store metadata associated with each raw and/or common field. An example of a process for mapping fields is described in greater detail below with reference to FIG. 9.

Process 800 extracts (820) views based on common fields and metadata. Although views often refer to live queries that can be used to query tables of the master data storage, views in accordance with a variety of embodiments can also refer to hardened tables that are generated based on such queries. In many embodiments, processes can extract views by generating queries (e.g., against a master database) to compile the data based on the mapped common field names and/or any active raw field names. Extracted views in accordance with some embodiments can include aggregated views that group data over specific fields and/or over specified timeframes. In several embodiments, groupings for aggregated views are determined based on metadata for the raw and/or common fields. An example of a process for generating queries to extract views is described in greater detail below with reference to FIG. 10.

While specific processes for extracting data views are described above, any of a variety of processes can be utilized to extract data views as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 9:
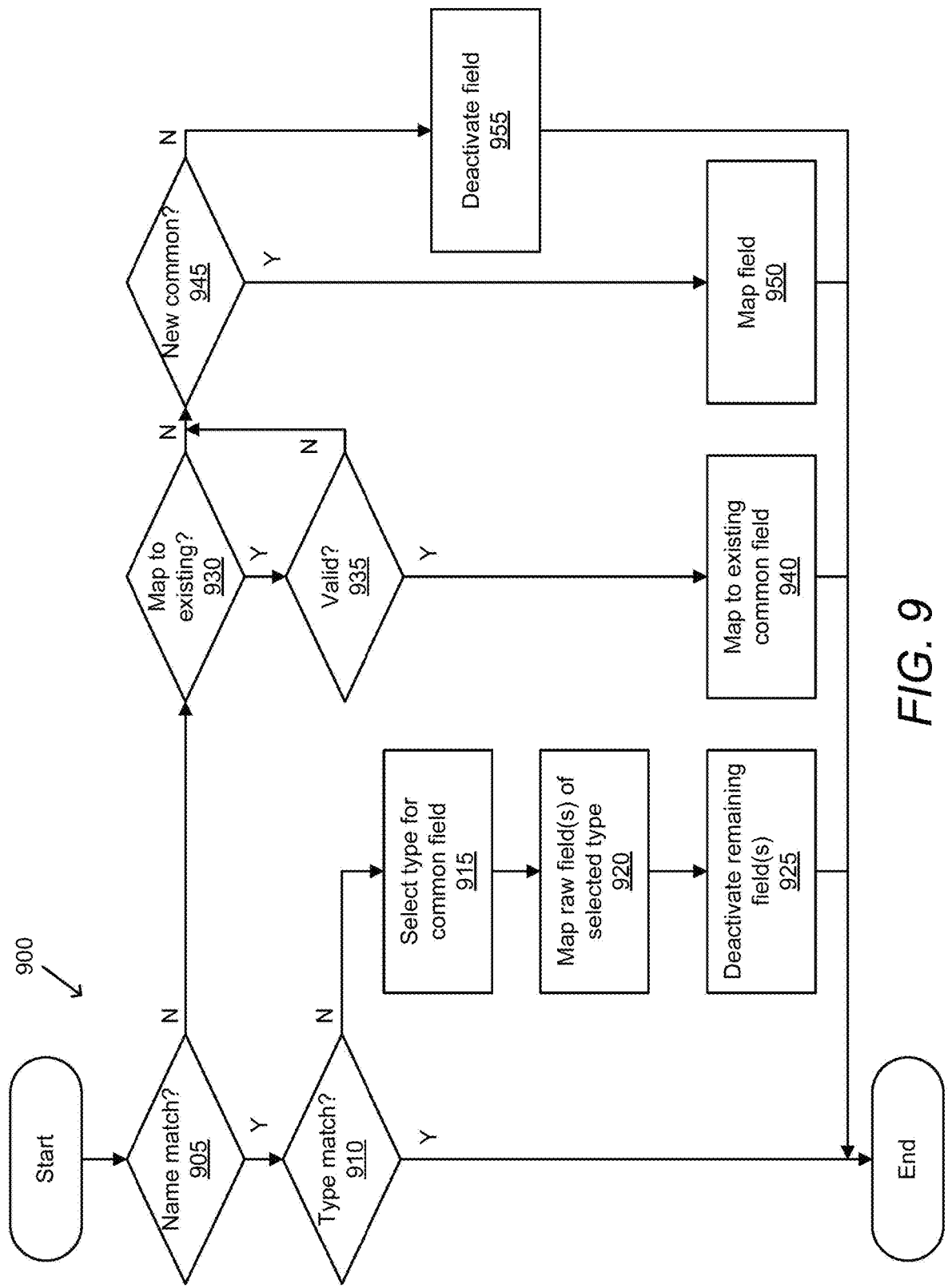
FIG. 9 conceptually illustrates an example of a process for mapping unknown raw fields in accordance with an embodiment of the invention.

An example of a process for mapping unknown raw fields in accordance with an embodiment of the invention is illustrated in FIG. 9. Process can be performed for each field of a data source. Process 900 determines (905) whether the name of the new field matches with the name of a previously mapped raw field. When the process determines that the name matches with an existing field name, process 900 determines (910) whether the data type of the new field has the same type as the matched field. In many embodiments, processes can determine whether the data type of the new field can be cast into the data type of the matched field. For example, if the matched field is numeric, but the new field is a string of numbers, the string may be cast into a numeric data type and the type may be considered to match.

When both the name and type of the new field matches the name and type of an existing field, the new field has already been mapped and the process ends. When the type of the new field differs from the type of the existing field, process 900 selects (915) a type for the common field. In several embodiments, processes can determine that change to the type for a common field should occur when a different data type becomes more common than the current data type. In a variety of embodiments, the use of a new data type must exceed a particular threshold (e.g., 95%).

Process 900 maps (920) the raw field(s) of the selected type to the common field and deactivates (925) the remaining fields with different types. Deactivating a field in accordance with various embodiments can be done by marking the field as inactive. The process then ends.

When the process determines (905) that the name of the unmapped field does not match with any existing mapped raw field names, process 900 determines (930) whether to map the new field to an existing common field. Processes in accordance with a number of embodiments can determine the existing common field based on user input (e.g., prompt a user for the common field). In some embodiments, processes can automatically determine the existing common field, or can provide a list of proposed common fields that are selected and/or sorted based on various factors, such as (but not limited to) similarities in the field names, data types of the raw and common fields, context information (e.g., other related fields for the record, data source, etc.). Processes in accordance with several embodiments of the invention can parse a raw field name into components and update with standardized terms. For example, a raw field name "hhID" can be parsed to "hh" and "ID" based on the naming convention, where "hh" is a common abbreviation for "HOUSEHOLD". The "hh" component can be replaced with "HOUSEHOLD" and the naming convention can be updated to separate components with an underscore, to match with common field name "HOUSEHOLD_ID".

When the process determines to map to an existing field, process 900 validates (935) whether the new field can be mapped to the common field. Validating a new field mapping in accordance with many embodiments can include (but is not limited to) verifying that the data types match, verifying that sample values from both fields are similar (e.g., in a similar range, have similar distributions, have similar values, etc.). In certain embodiments, validation can be performed on proposed common fields prior to allowing a user to select it.

When the mapping is valid, process 900 maps (940) the new field to the selected common field and the process ends. When the new field is not mapped to an existing field or the mapping is not valid, process 900 determines (945) whether to map the new field to a new common field. New common fields in accordance with various embodiments can be added by various individuals (e.g., data administrators). Creating new common fields in accordance with various embodiments can require a user to provide descriptions, aggregation data, etc. In a variety of embodiments, new fields can be verified to ensure they follow a consistent naming convention (e.g., upper/lower/camel case, standardized terms/abbreviations, separators, etc.).

When the process determines (945) to create a new common field, process 900 maps (950) the new raw field to the newly created common field and the process ends. When the process determines (945) that no new common field is to be created, process 900 deactivates (955) the new raw field and the process ends.

While specific processes for mapping data fields are described above, any of a variety of processes can be utilized to map data fields as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Figure 10:
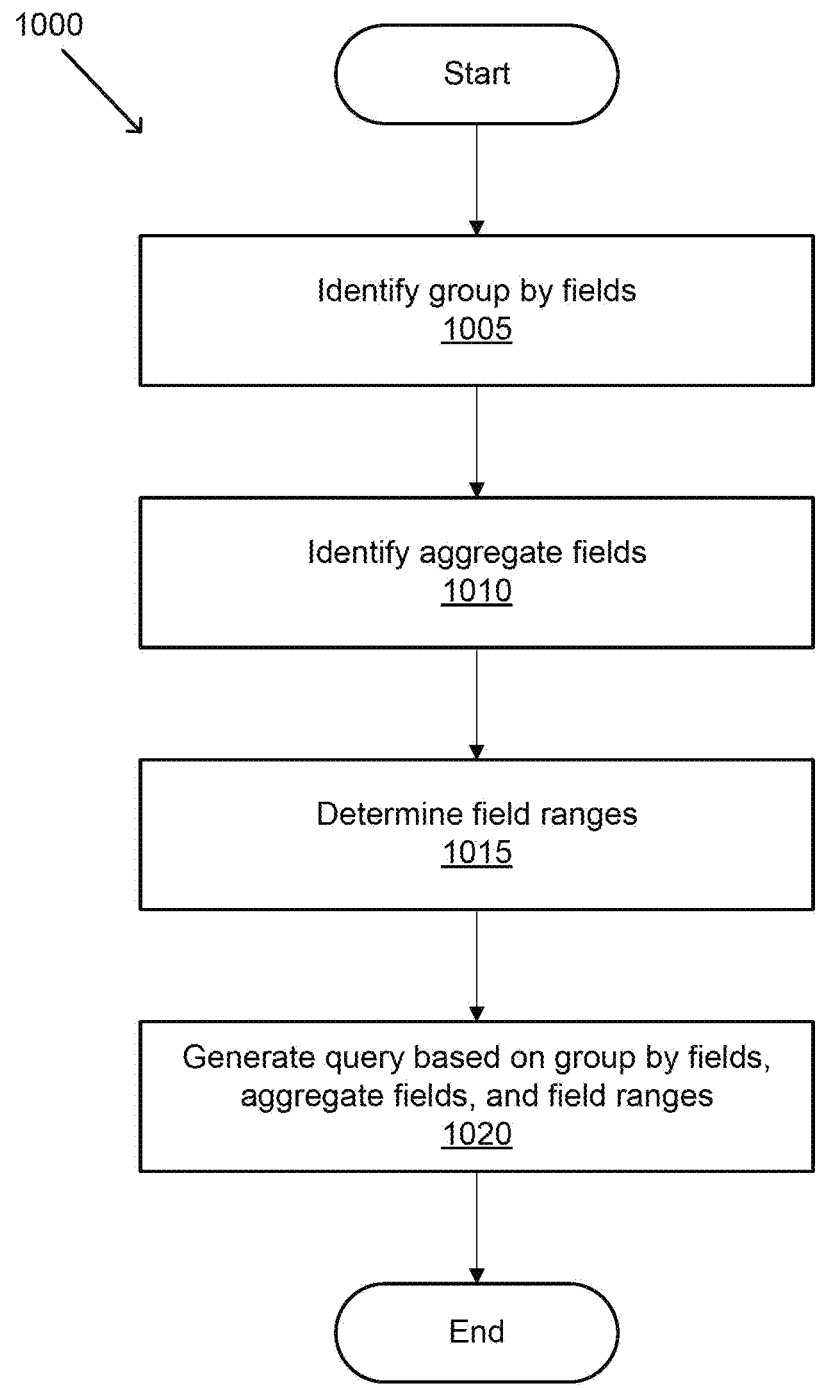
FIG. 10 conceptually illustrates an example of a process for generating queries for extract views in accordance with an embodiment of the invention.

An example of a process for generating queries for extract views in accordance with an embodiment of the invention is illustrated in FIG. 10. In a number of embodiments, extract views can be generated as SQL queries and/or as hardened tables generated from such queries. Process 1000 identifies (1005) group by fields for the data. In a number of embodiments, group by fields are fields that have been designated for grouping in a mapping metadata table.

Process 1000 identifies (1010) aggregate fields for aggregating the data. In several embodiments, processes can aggregate data over specific fields and/or over specified timeframes. Aggregate fields in accordance with certain embodiments can include fields that have been marked for aggregation, as well as the type(s) of aggregation (e.g., sum, count, average, percentile calculations, etc.) that have been designated for each field.

Process 1000 determines (1015) field ranges. Field ranges in accordance with a variety of embodiments can indicate a range over which a particular raw field is to be associated with a given common field. For example, the data storage may have records with a raw field name "hh" for a version 1 of a software application and "HH" for a version 2 of the application, which both map to "Household_ID". The field ranges would indicate that data from field "hh" should be pulled when the version is 1, while data from field "HH" should be pulled when the version is two.

Process 1000 generates (1020) a query based on the group by fields, aggregate fields, and the determined field ranges. In some embodiments, the generated query is stored as an auto extract view that can be used for reporting. In certain embodiments, the generated query can be used to generate hardened tables that can be queried against (e.g., through a data visualization tool). When there are multiple raw fields mapped to a single common field, processes in accordance with numerous embodiments of the invention can determine a differentiating characteristic (e.g., build version, time ranges, etc.) for the different fields and build a conditional query that uses different raw fields based on the field characteristics. An example of a generated query is described in greater detail below with reference to FIG. 11.

While specific processes for generating queries are described above, any of a variety of processes can be utilized to generate queries for extract views as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. For example, processes in accordance with certain embodiments of the invention may not aggregate the data at all, but may rather be used to generate queries that can be used to generate intermediate columnar tables from raw JSON data.

An example of a generated query in accordance with an embodiment of the invention is illustrated in FIG. 11. In this example, JSON records 1105 and 1110 provide data for volume change events. JSON record 1105 is formatted for build version 1, while JSON record 1110 is formatted for build version 2. In a variety of embodiments, the format for similar events can vary across different build versions. In this example, the order of the fields has changed (e.g., "model" comes before "Time" in 1105, but after "Time" in 1110), the names of certain fields have changed (e.g., "hh" in 1105 is "household_id" in 1110), and the structure of the fields has changed (e.g., "hh" was nested in "event_attributes" in 1105, but "household_id" is not nested in 1110.

Once the raw fields have been mapped to common fields, a query 1115 can be generated based on the mappings. In query 1115, fields from the RAW_JSON table are mapped to new column names (e.g., RAW_JSON['event_name'] as EVENT_NAME). When a field changes between versions, queries in accordance with certain embodiments of the invention can be generated (e.g., via mapping tables) to draw from different raw fields based on the version. In this example, raw field "['event_attributes']['hh']" for build version 1 and "['household_id']" for version 2 are both mapped to the common field "HOUSEHOLD_ID". Data records 1120 illustrate the result of query 1115 from JSON records 1105 and 1110. The results of generated queries can map corresponding raw fields to a common field to extract data views in accordance with a variety of embodiments of the invention. Although the example described above references mapping fields based on build version, one skilled in the art will recognize that similar systems and methods can be based on other characteristic ranges, including (but not limited to) time frames, events, product groups, geographic regions, etc. without departing from this invention.

Although specific methods of extracting data views from heterogeneous data are discussed above, many different methods of extracting data views can be implemented in accordance with many different embodiments. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing system comprising:
at least one processor;
at least one non-transitory computer-readable medium comprising program instructions that are executable by the at least one processor such that the computing system is configured to:
receive, via the Internet from a first device operating on a first local area network, first data corresponding to a first event associated with the first device, wherein the first data comprises one or more first data fields having corresponding first values;
receive, via the Internet from a second device operating on a second local area network different from the first local area network, second data corresponding to a second event associated with the second device, the second event different from the first event, wherein the second data comprises one or more second data fields having corresponding second values, and wherein at least one second data field in the one or more second data fields corresponds to at least one first data field in the one or more first data fields;
associate, by the computing system, one or more of the one or more first data fields and one or more of the one or more second data fields to one or more standard data fields, wherein the at least one second data field and the at least one first data field are associated with a particular standard data field in the one or more standard data fields;
receive, via the Internet from a computing device operating on a third local area network, an indication of a user request to generate a data view based on the first data and the second data;
based on the received indication of the user request, generate a data view based on the one or more standard data fields, wherein the data view comprises a representation corresponding to the particular standard data field that comprises: (i) a corresponding first value of the at least one first data field, and (ii) a corresponding second value of the at least one second data field; and
transmit, via the Internet to the computing device, data that causes the computing device to display the generated data view.

2. The computing system of claim 1, wherein:
the first device is associated with a first system of devices; and
the second device is associated with a second system of devices different from the first system of devices.

3. The computing system of claim 2, wherein:
the first system of devices is connected to the first local area network; and
the second system of devices is connected to the second local area network.

4. The computing system of claim 1, wherein at least one first data field in the one or more first data fields is different than at least one second data field in the one or more second data fields.

5. The computing system of claim 1, wherein the first device and the second device are different types of devices.

6. The computing system of claim 1, wherein:
the first device operates a first software version of an application; and
the second device operates a second software version of the application different than the first software version of the application.

7. The computing system of claim 1, wherein the corresponding first value and the corresponding second value are different.

8. The computing system of claim 1, wherein the corresponding first value is associated with an attribute and the corresponding second value is also associated with the attribute.

9. The computing system of claim 8, wherein the at least one first data field and the at least one second data field correspond to the attribute.

10. The computing system of claim 8, wherein the particular standard data field corresponds to the attribute.

11. A non-transitory computer-readable medium having stored thereon instructions executable by one or more processors to cause a computing system to perform functions comprising:

receiving, via the Internet from a first device operating on a first local area network, first data corresponding to a first event associated with the first device, wherein the first data comprises one or more first data fields having corresponding first values;

receiving, via the Internet from a second device operating on a second local area network different from the first local area network, second data corresponding to a second event associated with the second device, the second event different from the first event, wherein the second data comprises one or more second data fields having corresponding second values, and wherein at least one second data field in the one or more second data fields corresponds to at least one first data field in the one or more first data fields;

associating, by the computing system, one or more of the one or more first data fields and one or more of the one or more second data fields to one or more standard data fields, wherein the at least one second data field and the at least one first data field are associated with a particular standard data field in the one or more standard data fields;

receiving, via the Internet from a computing device operating on a third local area network different from the first and second local area networks, an indication of a user request to generate a data view based on the first data and the second data;

based on the received indication of the user request, generating a data view based on the one or more standard data fields, wherein the data view comprises a representation corresponding to the particular standard data field that comprises: (i) a corresponding first value of the at least one first data field, and (ii) a corresponding second value of the at least one second data field; and transmitting, via the Internet to the computing device, data that causes the computing device to display the generated data view.

12. The non-transitory computer-readable medium of claim 11, wherein:

the first device is associated with a first system of devices; and the second device is associated with a second system of devices different from the first system of devices.

13. The non-transitory computer-readable medium of claim 12, wherein:

the first system of devices is connected to the first local area network; and the second system of devices is connected to the second local area network.

14. The non-transitory computer-readable medium of claim 11, wherein at least one first data field in the one or more first data fields is different than at least one second data field in the one or more second data fields.

15. The non-transitory computer-readable medium of claim 11, wherein the first device and the second device are different types of devices.

16. The non-transitory computer-readable medium of claim 11, wherein:

the first device operates a first software version of an application; and the second device operates a second software version of the application different than the first software version of the application.

17. The non-transitory computer-readable medium of claim 11, wherein the corresponding first value and the corresponding second value are different.

18. The non-transitory computer-readable medium of claim 11, wherein the corresponding first value is associated with an attribute and the corresponding second value is also associated with the attribute.

19. The non-transitory computer-readable medium of claim 18, wherein the at least one first data field and the at least one second data field correspond to the attribute.

20. A method to be performed by a computing system, the method comprising:

receiving, via the Internet from a first device operating on a first local area network, first data corresponding to a first event associated with the first device, wherein the first data comprises one or more first data fields having corresponding first values;

receiving, via the Internet from a second device operating on a second local area network different from the first local area network, second data corresponding to a second event associated with the second device, the second event different from the first event, wherein the second data comprises one or more second data fields having corresponding second values, and wherein at least one second data field in the one or more second data fields corresponds to at least one first data field in the one or more first data fields;

associating, by the computing system, one or more of the one or more first data fields and one or more of the one or more second data fields to one or more standard data fields, wherein the at least one second data field and the at least one first data field are associated with a particular standard data field in the one or more standard data fields;

receiving, via the Internet from a computing device operating on a third local area network different from the first and second local area networks, an indication of a user request to generate a data view based on the first data and the second data;

based on the received indication of the user request, generating a data view based on the one or more standard data fields, wherein the data view comprises a representation corresponding to the particular standard data field that comprises: (i) a corresponding first value of the at least one first data field, and (ii) a corresponding second value of the at least one second data field; and transmitting, via the Internet to the computing device, data that causes the computing device to display the generated data view.

\* \* \* \* \*